(12) United States Patent
Ushigome

(10) Patent No.: US 8,120,852 B2
(45) Date of Patent: Feb. 21, 2012

(54) DIFFRACTIVE OPTICAL ELEMENT, OPTICAL SYSTEM, AND OPTICAL APPARATUS

(75) Inventor: Reona Ushigome, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 366 days.

(21) Appl. No.: 12/402,417

(22) Filed: Mar. 11, 2009

(65) Prior Publication Data

US 2009/0231712 A1    Sep. 17, 2009

(30) Foreign Application Priority Data

Mar. 12, 2008  (JP) ................. 2008-062676

(51) Int. Cl.
*G02B 5/18*    (2006.01)
(52) U.S. Cl. ........................................ 359/576
(58) Field of Classification Search .............. 359/569, 359/576
See application file for complete search history.

(56) References Cited

U.S. PATENT DOCUMENTS

| 5,847,877 A | 12/1998 | Imamura et al. |
| 6,392,805 B1 | 5/2002 | Ohmori |
| 2003/0161044 A1 | 8/2003 | Tokoyoda |
| 2006/0171031 A1 | 8/2006 | Suzuki |
| 2010/0134888 A1* | 6/2010 | Korenaga et al. ............. 359/576 |

FOREIGN PATENT DOCUMENTS

| JP | 11-271513 A | 10/1999 |
| JP | 2003-227913 A | 8/2003 |
| JP | 2005-107298 A | 4/2005 |
| JP | 3717555 | 11/2005 |

* cited by examiner

*Primary Examiner* — Alessandro Amari
(74) *Attorney, Agent, or Firm* — Canon USA, Inc., I.P. Division

(57) ABSTRACT

The diffractive optical element includes a first diffraction grating and a second diffraction grating, which are formed of materials different from each other, the first diffraction grating and the second diffraction grating are stacked so as not to provide any air layer therebetween. The diffractive optical element satisfies conditions of $nd1<nd2$, $vd1<vd2$, $1.65 \leq nd1$, $vd1 \leq 20$, $1.73 \leq nd2$, and $15 \leq vd2 \leq 60$ where $nd1$ and $vd1$ respectively represent a refractive index and an Abbe constant of the material of the first diffraction grating for a d-line, and $nd2$ and $vd2$ respectively represent a refractive index and an Abbe constant of the material of the second diffraction grating for the d-line. The element is capable of reducing deterioration of a diffraction efficiency by an obliquely incident light, to improve the diffraction efficiency of a designed order light in a use wavelength range.

11 Claims, 8 Drawing Sheets

DIFFRACTIVE OPTICAL ELEMENT, OPTICAL SYSTEM, AND OPTICAL APPARATUS

BACKGROUND OF THE INVENTION

The present invention relates to a diffractive optical element, and in particular, to a diffractive optical element having a structure in which diffraction gratings formed of materials different from each other are stacked.

Methods for reducing chromatic aberration in a lens system include one in which a diffractive optical element is provided to a surface of a lens or part of the lens system. This method using the diffractive optical element utilizes a physical phenomenon that chromatic aberrations for a light ray at a certain reference wavelength are generated in directions opposite to one another by a refractive surface and a diffractive surface in an optical system. Further, the diffractive optical element is capable of providing an effect as an aspheric surface lens by varying a period of its periodic structure, which brings about an effect of reducing not only the chromatic aberration, but also aberrations other than the chromatic aberration.

In a case in which, in an optical system including the diffractive optical element, a light flux in a use wavelength range mainly includes diffracted light of a certain specific order (hereinafter referred to as "specific order" or "designed order"), intensities of diffracted lights of orders other than the designed order are low. The intensity 0 means nonexistent diffracted light.

However, in reality, in a case in which the unnecessary diffracted lights of the orders other than the designed order exist and they have high intensities, the unnecessary diffracted lights travel through the optical system along paths different from that of the diffracted light of the designed order to become flare light. Therefore, in order to utilize the aberration reduction effect of the diffractive optical element, diffraction efficiency for the diffracted light of the designed order is required to be sufficiently high in the entire use wavelength range. Further, it is important that a spectral distribution of the diffraction efficiency of the diffracted light of the designed order and behaviors of the unnecessary diffracted lights of the orders other than the designed order are sufficiently considered.

Japanese Patent No. 3717555, Japanese Patent Laid-Open No. 11-271513, Japanese Patent Laid-Open No. 2003-227913, and Japanese Patent Laid-Open No. 2005-107298 (hereinafter respectively referred to as Documents I to IV) disclose diffractive optical elements having a structure in which its diffraction efficiency is improved to reduce unnecessary diffracted light. Each of the diffractive optical elements disclosed in Documents I to IV is a diffractive optical element in which two diffraction gratings are stacked so as not to provide any air layer (or gap, or space) therebetween. Such a diffractive optical element is hereinafter referred to as a "contacting two-layer DOE". In Documents I to IV, a diffractive optical element is realized which has a tolerably high diffraction efficiency for diffracted light of a specific order in a broad wavelength range by appropriately setting materials forming the respective diffraction gratings and heights of the grating portions (grating heights) respectively having slope surfaces and side surfaces. The diffraction efficiency is expressed by a percentage of an amount of diffracted light of each order with respect to an amount of an entire transmitted light flux.

However, in Documents I to IV, only an effect of the slope surfaces of the diffraction gratings is taken into consideration, but an effect of the side surfaces of the diffraction gratings is not taken into consideration. Therefore, the diffraction efficiency for the specific order (designed order) is not sufficiently high.

BRIEF SUMMARY OF THE INVENTION

The present invention provides a diffractive optical element capable of reducing deterioration of diffraction efficiency due to obliquely incident light to improve the diffraction efficiency for a designed order in a use wavelength range, with consideration of an effect of side surfaces of the diffraction gratings.

The present invention provides as one aspect thereof a diffractive optical element including a first diffraction grating and a second diffraction grating, which are formed of materials different from each other, the first diffraction grating and the second diffraction grating are stacked so as not to provide any air layer therebetween. The diffractive optical element satisfies the following conditions:

$$nd1 < nd2$$

$$vd1 < vd2$$

$$1.65 \leq nd1, vd1 \leq 20$$

$$1.73 \leq nd2, 15 \leq vd2 \leq 60$$

where nd1 and vd1 respectively represent a refractive index and an Abbe constant of the material of the first diffraction grating for a d-line, and nd2 and vd2 respectively represent a refractive index and an Abbe constant of the material of the second diffraction grating for the d-line.

The present invention provides as another aspect thereof an optical system including the above diffractive optical element and a refractive optical element.

The present invention provides as still another aspect thereof an optical apparatus including the above optical system.

Other aspects of the present invention will become apparent from the following description and the attached drawings.

DETAILED DESCRIPTION OF THE EMBODIMENTS

Exemplary embodiments of the present invention will hereinafter be described with reference to the accompanying drawings.

Embodiment 1

Figure 1:
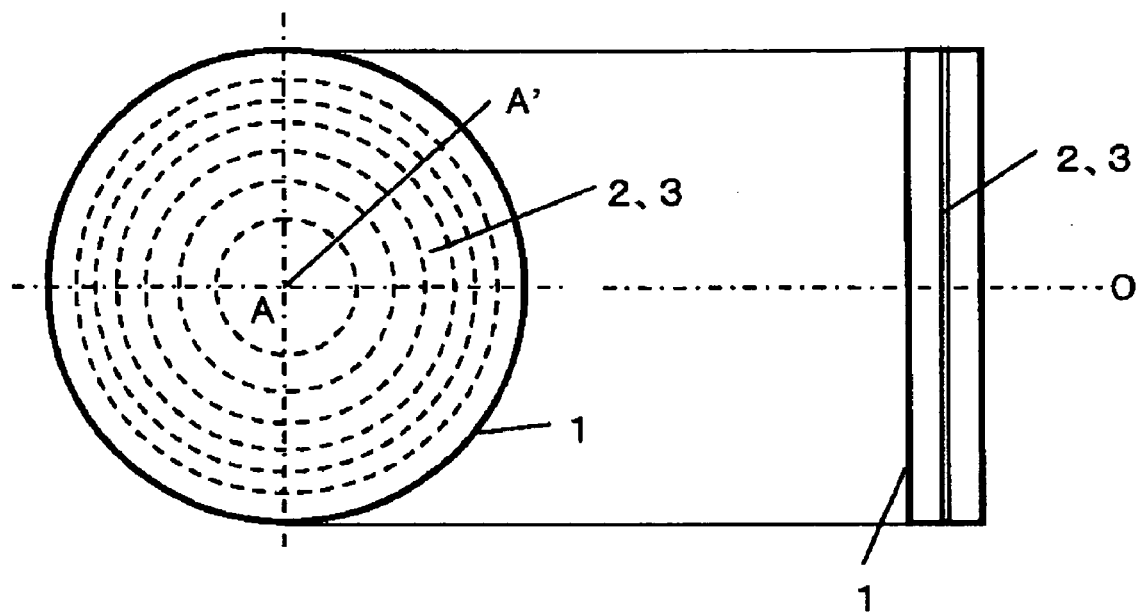
FIG. 1 shows a front view and a side view of a diffractive optical element that is Embodiment 1 of the present invention.
Figure 2:
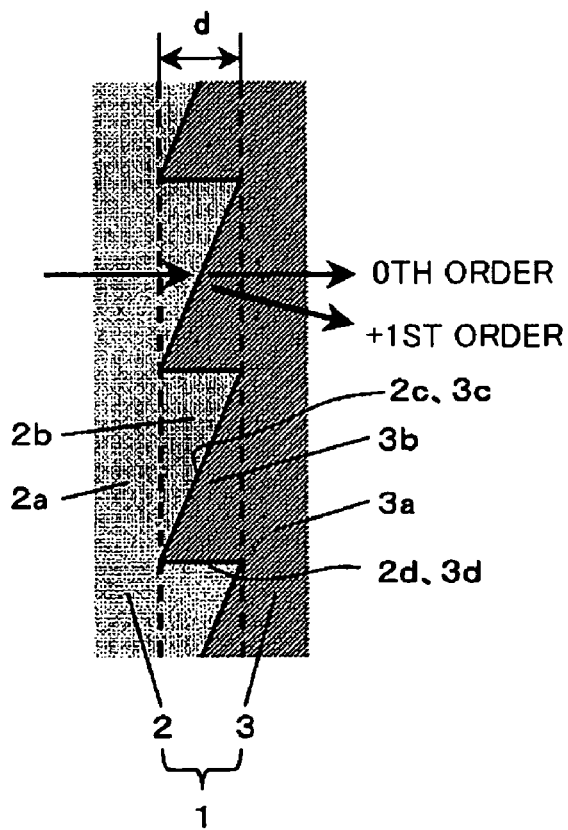
FIG. 2 is a cross-sectional view showing a structure of the diffractive optical element of Embodiment 1.

FIG. 1 shows a front view and a side view of a diffractive optical element that is a first embodiment (Embodiment 1) of the present invention. FIG. 2 shows part of a cross section of the diffractive optical element shown in FIG. 1, which is cut along a line A-A' in FIG. 1. FIG. 2 deforms the diffractive optical element in a grading height (or depth) direction, that is, in a horizontal direction of the drawing, in order to make its grating shapes clearly understandable.

In FIGS. 1 and 2, the diffractive optical element 1 is a contacting two-layer DOE having a structure in which a first diffraction grating 2 and a second diffraction grating 3 are stacked so as not to provide any air layer (or gap, or space) between their grating surfaces. The term "so as not to provide any air layer between the grating surfaces" can be rephrased with "so as to make the grating surfaces contact each other". These first and second diffraction gratings 2 and 3 function as one diffractive optical element.

Reference numeral 2b denotes a grating portion forming the first diffraction grating 2, and reference numeral 2a denotes a base portion on which a plurality of the grating portions 2b are formed. Reference numeral 3b denotes a grating portion forming the second diffraction grating 3, and reference numeral 3a denotes a base portion on which a plurality of the grating portions 3b are formed. The plurality of the grating portions 2b and 3b are concentrically formed in the respective first and second diffraction gratings 2 and 3. Gradually decreasing pitches of the grating portions 2b and 3b from a central part toward a peripheral part brings about a lens effect (a converging effect or a diverging effect) to the diffractive optical element 1. The pitch of the grating portions is hereinafter referred to as "grating pitch". Further, reference numerals 2c and 3c denote slope surfaces (hereinafter referred to as "grating slope surfaces") of the grating portions 2b and 3b, and reference numerals 2d and 3d denote side surfaces (hereinafter referred to as "grating side surfaces") of the grating portions 2b and 3b. The grating slope surfaces and the grating side surfaces are also collectively referred to as "grating surfaces".

In the present embodiment, the diffractive optical element 1 is formed into a flat plate shape on the base surface which is a flat surface. However, the base surface on which the diffractive optical element is formed is not limited to a flat surface, and may be a spherical surface or an aspheric surface.

Further, when the grating pitch of the grating portions 2b and 3b is represented by P (μm), and a grating height (also referred to as "grating thickness") of the grating portions 2b and 3b is represented by d (μm), each of the diffraction gratings 2 and 3 satisfies a condition of d/P<⅙. Satisfying this condition makes the shapes of the grating portions 2b and 3b easy to manufacture.

Further, a use wavelength range (also referred to as "designed wavelength range") of the diffractive optical element 1 in the present embodiment is a visible wavelength range. Materials forming the first and second diffraction gratings 2 and 3 (materials which are different from each other) and their grating heights are selected such that diffraction efficiency for diffracted light of a +1st order (hereinafter referred to as "+1st-order diffracted light") is high in the entire visible wavelength range. That is, the materials and the grating heights of the first and second diffraction gratings 2 and 3 are determined such that, within the use wavelength range, a maximum optical path length difference of lights passing through each of the first and second diffraction gratings 2 and 3 is equal to or near an integral multiple of a wavelength of the lights. The maximum optical path length difference corresponds to a difference between optical path lengths of light rays respectively passing through an apex of a mountain and a bottom of a valley in the grating portions 2b and 3b. Appropriately setting the materials and the shape of the first and second diffraction gratings 2 and 3 enables provision of a high diffraction efficiency in the entire use wavelength range.

Next, the diffraction efficiency of the diffractive optical element 1 in the present embodiment will be described. First, diffraction efficiency obtained by using a conventional scalar diffraction theory calculation will be described.

In the contacting two-layer DOE, a condition under which the diffraction efficiency of diffracted light of a certain order at a designed wavelength (or use wavelength) λ is maximized is to determine the maximum optical path length differences of the respective grating portions in the entire diffraction grating such that a value obtained by adding the maximum optical path length differences is an integral multiple of the designed wavelength. Accordingly, the condition under which the diffraction efficiency of diffracted light whose diffraction order is m is maximized for a light ray which vertically enters the base surface of the first diffraction grating 2 as shown in FIG. 2 and whose wavelength is a designed wavelength λ is:

$$\pm(n01-n02)d=m\lambda \quad (1).$$

In the expression (1), n01 represents a refractive index at the designed wavelength λ of a material forming the first diffraction grating 2, and n02 represents a refractive index at the designed wavelength λ of a material forming the second diffraction grating 3. Further, d represents a grating height of the first and second diffraction gratings 2 and 3, and m is a diffraction order.

Hereinafter, a diffraction order of light ray diffracted downward from 0th-order diffracted light shown in FIG. 2 is defined as a positive diffraction order, and a diffraction order of light ray diffracted upward from the 0th-order diffracted light is defined as a negative diffraction order.

Positive and negative signs for the grating height d in the expression (1) are as follows. In a case in which the refractive indexes n01 and n02 of the materials of the first and second diffraction gratings 2 and 3 are in a relationship of n01<n02, and the grating height of the first diffraction grating 2 increases (in other words, the grating height of the second diffraction grating 3 decreases) from the lower side toward the upper side in FIG. 2, the sign for the grating height d is negative. In contrast thereto, in a case in which the refractive indexes n01 and n02 are in a relationship of n01>n02, and the grating height of the first diffraction grating 2 decreases (in other words, the grating height of the second diffraction grating 3 increases) from the lower side toward the upper side in FIG. 2, the sign for the grating height d is positive. That is, in the case in which the refractive indexes n01 and n02 are in the relationship of n01<n02 in the structure shown in FIG. 2, the expression (1) is rewritten as:

$$(n02-n01)d=m\lambda \quad (2).$$

In the structure shown in FIG. 2, diffraction efficiency $\eta(\lambda)$ at the designed wavelength (use wavelength) $\lambda$ can be expressed by:

$$\eta(\lambda) = \sin c^2 [\pi\{m - (n02 - n01)d/\lambda\}] = \sin c^2 [\pi\{m - \phi 0/\lambda\}] \quad (3).$$

where $\phi 0$ in the expression (3) is:

$$\phi 0 = (n02 - n01)d \quad (4),$$

and d represents the grating height of the grating portions 2b and 3b.

When the designed order is the +1st order, and the designed wavelength is a wavelength of a d-line, the diffraction efficiency depends on the expression (4), which is understood from the expression (3), and a product of the refractive index difference (n02−n01) and the grating height d in the expression (4) satisfies the relationship of the expression (2). It can be understood that the terms of the refractive indexes in the expressions (2) and (4) depend on, not absolute values of the refractive indexes, but the refractive index difference. Therefore, in a case in which the grating height is fixed to 10 μm for example, if the refractive index difference is 0.058756, the diffraction efficiency reaches 100%, and thus the diffraction efficiency does not depend on the absolute values of the refractive indexes.

Each of Documents I to IV calculates the diffraction efficiency of the diffractive optical element using the scalar diffraction theory calculation to perform design evaluation. The scalar diffraction theory calculation has been known as a calculation method by which diffraction efficiency can be accurately calculated when a grating pitch of a diffraction grating is sufficiently larger than a wavelength of entering light. However, the scalar diffraction theory calculation takes only a diffraction phenomenon caused by grating slope surfaces of the diffraction grating into consideration, and does not take an effect of grating side surfaces into consideration. Since an actual diffractive optical element has not only the grating slope surfaces, but also the grating side surfaces, it is necessary to take the effect of the grating side surfaces into consideration. Thus, the diffraction efficiency disclosed in each of Documents I to IV is a value calculated without taking the effect of the grating side surfaces of the diffraction grating into consideration.

Therefore, the present embodiment uses a rigorous electromagnetic calculation which is a method by which diffraction efficiency can be calculated with consideration of the effect of the grating side surfaces of the diffraction grating. The rigorous electromagnetic calculation is capable of rigorously calculating diffraction efficiencies for transmitted diffracted light and reflected diffracted light of the respective orders in an arbitrary-shaped structure by numerically solving Maxwell equations.

Conventionally, the rigorous electromagnetic calculation is frequently used for a case where a grating pitch is smaller than a wavelength of entering light, which deteriorates accuracy in the scalar diffraction theory calculation. However, the rigorous electromagnetic calculation is capable of determining a rigorous diffraction efficiency even when the grating pitch is sufficiently larger than the wavelength of the entering light. Further, since the rigorous electromagnetic calculation is capable of calculating diffraction efficiency in the arbitrary-shaped structure, the rigorous electromagnetic calculation is capable of calculating diffraction efficiency with consideration of the effect of the grating side surfaces, which are not taken into consideration in the scalar diffraction theory calculation. Therefore, the inventors calculated the diffraction efficiency using an RCWA (Rigorous Coupled Wave Analysis) included in the rigorous electromagnetic calculation. Table 1 and Table 2 show the calculation results of the diffraction efficiency by the scalar diffraction theory calculation and the RCWA in four types (types 1 to 4) of diffractive optical elements whose parameters are different from one another.

TABLE 1

| DIFFRACTIVE OPTICAL ELEMENT | TYPE 1 | TYPE 2 | TYPE 3 | TYPE 4 |
|---|---|---|---|---|
| ANGLE OF INCIDENCE (deg) | 0 | 0 | 0 | 0 |
| WAVELENGTH (nm) | 587.56 | 587.56 | 587.56 | 587.56 |
| FIRST DIFFRACTION GRATING MATERIAL n01 | 1.341244 | 1.541244 | 1.741244 | 1.941244 |
| SECOND DIFFRACTION GRATING MATERIAL n02 | 1.400000 | 1.600000 | 1.800000 | 2.000000 |
| REFRACTIVE INDEX DIFFERENCE n01 − n02 | 0.058756 | 0.058756 | 0.058756 | 0.058756 |
| GRATING HEIGHT (μm) | 10 | 10 | 10 | 10 |
| GRATING PITCH (μm) | 100 | 100 | 100 | 100 |
| +1ST ORDER DIFFRACTION EFFICIENCY (%) (SCALAR DIFFRACTION THEORY CALCULATION) | 100 | 100 | 100 | 100 |
| +1ST ORDER DIFFRACTION EFFICIENCY (%) (RCWA) | 98.59 | 98.68 | 98.73 | 98.82 |

TABLE 2

| DIFFRACTIVE OPTICAL ELEMENT | TYPE 1 | TYPE 2 | TYPE 3 | TYPE 4 |
|---|---|---|---|---|
| INCIDENT ANGLE (deg) | 0 | 0 | 0 | 0 |
| WAVELENGTH (nm) | 587.56 | 587.56 | 587.56 | 587.56 |
| FIRST DIFFRACTION GRATING MATERIAL n01 | 1.341244 | 1.541244 | 1.741244 | 1.941244 |
| SECOND DIFFRACTION GRATING MATERIAL n02 | 1.400000 | 1.600000 | 1.800000 | 2.000000 |
| REFRACTIVE INDEX DIFFERENCE n01 − n02 | 0.058756 | 0.058756 | 0.058756 | 0.058756 |

TABLE 2-continued

| DIFFRACTIVE OPTICAL ELEMENT | TYPE 1 | TYPE 2 | TYPE 3 | TYPE 4 |
|---|---|---|---|---|
| GRATING HEIGHT (μm) | 10 | 10 | 10 | 10 |
| GRATING PITCH (μm) | 200 | 200 | 200 | 200 |
| +1ST-ORDER DIFFRACTION EFFICIENCY (%) (SCALAR DIFFRACTION THEORY CALCULATION) | 100 | 100 | 100 | 100 |
| +1ST-ORDER DIFFRACTION EFFICIENCY (%) (RCWA) | 99.29 | 99.41 | 99.70 | 99.88 |

In calculation conditions for calculating the diffraction efficiency of the diffractive optical elements 1 to 4, the refractive indexes of the materials of the first and second diffractive gratings are different from each other, but the refractive index differences thereof are the same. Further, in other calculation conditions, the incident angle of 0 degree and the grating height of 10 μm are common in Table 1 and Table 2, and the grating pitch in Table 1 is 100 μm, and the grating pitch in Table 2 is 200 μm.

A calculation order serving as a calculation parameter in the RCWA is equal to or higher than an order of which unnecessary diffracted light sufficiently converges to zero, and the number of levels (the number of divided steps of the diffraction grating) is equal to or more than the calculation order because diffracted light according to the number of the levels is generated as a calculation error.

In Table 1 and Table 2, the diffraction efficiency obtained by the scalar diffraction theory calculation reaches 100%. In contrast thereto, the diffraction efficiency for the +1st-order diffracted light which is normalized by a sum of the diffraction efficiencies of all the transmitted diffracted lights does not reach 100% in the calculation result by the RCWA. Moreover, among the diffraction efficiencies for the +1st-order diffracted lights in the diffractive optical elements 1 to 4, diffraction efficiency is higher in a diffractive optical element in which materials with higher absolute values of their refractive indexes are combined. Further, a diffractive optical element whose grating pitch is 200 μm provides a higher diffraction efficiency for the +1st-order diffracted light than that of a diffractive optical element whose grating pitch is 100 μm. This is because a contribution of the grating side surface to a diffractive effect decreases as the grating pitch increases. Therefore, in the diffractive optical element shown in FIG. 1, a level of the contribution of the grating side surface is lower in the central part having a larger grating pitch.

Further, in both cases in which the grating pitches are 100 μm and 200 μm, a diffractive optical element in which materials with higher absolute values of their refractive indexes are combined provides a higher diffraction efficiency for the +1st-order diffracted light. That is, a diffractive optical element in which materials with higher absolute values of their refractive indexes are combined has a higher diffraction efficiency in the entire diffractive optical element.

Thus, since the diffraction efficiency depends on the refractive index difference in the scalar diffraction theory calculation, calculation results of diffraction efficiencies of diffractive optical elements whose refractive indexes are the same are the same. However, it can be understood that a diffractive optical element having a combination of materials with higher refractive indexes has a higher diffraction efficiency for the +1st-order diffracted light in the rigorous electromagnetic calculation which also takes the effect of the grating side surfaces into consideration. Further, a peripheral part of a diffractive optical element having a smaller grating pitch than that in a central part thereof has a greater effect of the grating side surface on the diffraction efficiency for the +1st-order diffracted light.

As described above, as the materials of the diffraction gratings 2 and 3 forming the contacting two-layer DOE, it is preferable to use a combination of materials having refractive indexes as high as possible. In particular, it is preferable that a refractive index nd1 for the d-line of the material of the first diffraction grating 2 be equal to or higher than 1.65, a refractive index nd2 for the d-line of the material of the second diffraction grating 3 be equal to or higher than 1.73, and nd2 be higher than nd1.

That is, it is preferable to satisfy the following conditions:

$$nd1 < nd2$$

$$1.65 \leq nd1$$

$$1.73 \leq nd2.$$

If these conditions are not satisfied, the diffraction efficiency for the +1st-order diffracted light may be reduced, and the diffraction efficiency for the unnecessary diffracted light may be increased. In a case in which the diffractive optical element 1 in the present embodiment is used in an image-taking optical system of a camera, satisfying the above conditions can avoid the unnecessary diffracted light from having an effect on an image obtained by image-taking under a high intensity light source such as the sun, or an image obtained by a long-time exposure. It goes without saying that it is more preferable that materials having further higher refractive indexes be combined. This is the same in other embodiments which will be described later.

Next, a numerical example of the diffractive optical element 1 in the present embodiment will be described. Materials and grating heights of the respective diffraction gratings are not limited by the present numerical example. This is the same in numerical examples of the other embodiments which will be described later.

In the present numerical example, ultraviolet curable resin is used as a material of the first diffraction grating 2, and glass is used as a material of the second diffraction grating 3. Specifically, an ultraviolet curable resin PVCz (nd=1.696, vd=17.7, θgF=0.686) is used as the material of the first diffraction grating 2. Further, an optical glass K-VC89 (nd=1.810, vd=41.0, θgF=0.567) is used as the material of the second diffraction grating 3. θgF represents a partial dispersion ratio for a g-line and an F-line of the material. The grating height d is 5.2 μm.

Figure 3:
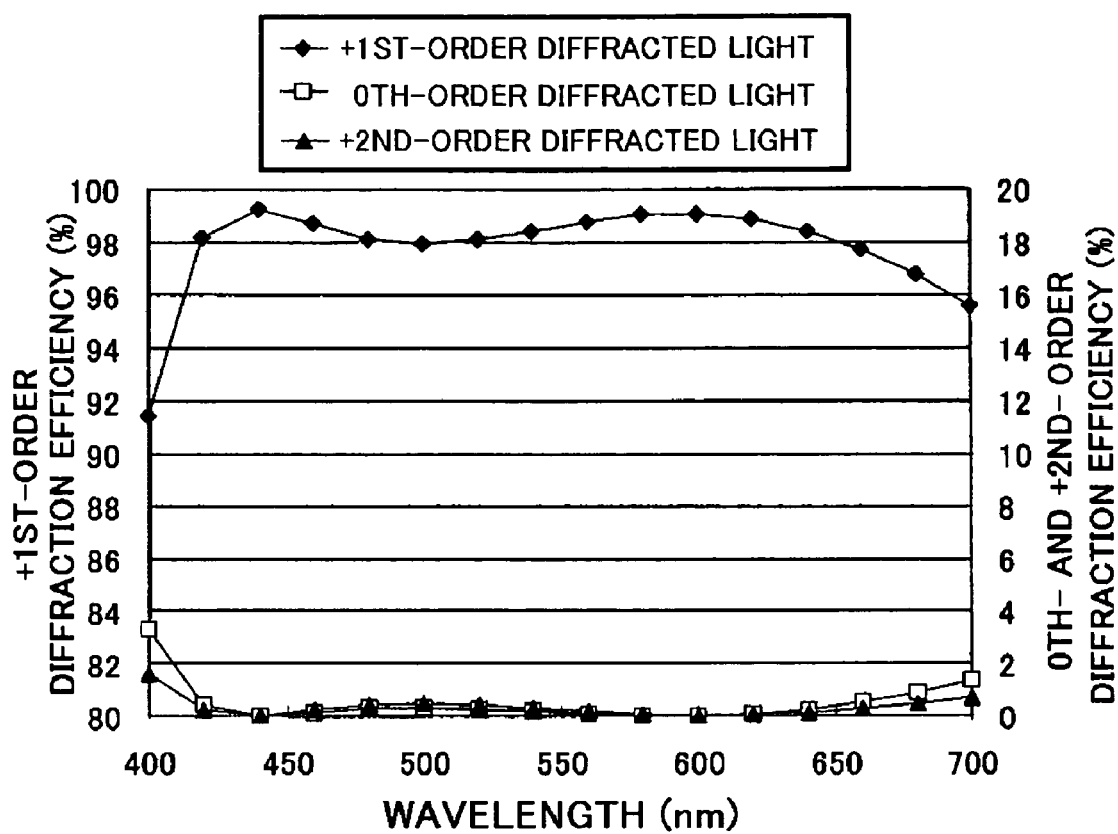
FIG. 3 is a graph showing diffraction efficiency of the diffractive optical element of Embodiment 1.

FIG. 3 shows the diffraction efficiency of the diffractive optical element of the present numerical example for the designed order (+1st order) and the diffraction efficiencies for unnecessary diffracted lights of a 0th order and a +2nd order with a grating pitch of 100 μm, the 0th order and the +2nd order being orders corresponding to the designed order ±1, respectively. In FIG. 3, the left vertical axis shows the diffraction efficiency for the diffracted light of the +1st order that is the designed order, and the right vertical axis shows the diffraction efficiencies for the diffracted lights of the 0th order and the +2nd order that are the unnecessary orders. The horizontal axis shows wavelength.

The present numerical example provides a diffraction efficiency of 97.2% or more for the designed order in the entire visible wavelength range (430 nm to 670 nm), and a diffraction efficiency of 1.0% or less for the unnecessary orders in the entire visible wavelength range. This numerical example shows the diffraction efficiency obtained with a grating pitch of 100 μm. However, since a contribution of the grating side surface to a diffractive effect further decreases when the grating pitch further increases, which further increases the diffraction efficiency for the designed order to further reduce the diffraction efficiencies for the unnecessary orders.

Moreover, this numerical example only shows the diffraction efficiencies for the 0th-order and the +2nd-order which are unnecessary orders. This is because image blurring on an image-forming surface formed by the unnecessary diffracted light increases as separation of the order thereof from the designed order increases, which makes the unnecessary diffracted light unnoticeable as flare. Further, this numerical example defines as the visible wavelength range a wavelength range from 430 nm to 670 nm, which is narrower than a generally-known visible wavelength from 400 nm to 700 nm. This is because luminous efficiency is low in the wavelength ranges from 400 nm to 420 nm and from 680 nm to 700 nm, which has a small effect on an image formed on the image-forming surface. It is more preferable that a wavelength range in which the diffraction efficiency for the designed order is high and the diffraction efficiencies for the unnecessary orders is low be as broad as possible. And, such a wavelength range is not limited to the wavelength range from 430 nm to 670 nm. These are the same in the other embodiments which will be described later.

Since each of the diffractive optical elements disclosed in Documents II to IV has a high grating height of 7 μm or more, the diffraction efficiency thereof for light obliquely entering the diffractive optical element (hereinafter referred to as "obliquely incident light") is significantly deteriorated, which limits optical systems to which the diffractive optical element can be applied. In contrast thereto, the grating height of the diffractive optical element of the present embodiment is significantly smaller than that of each of the diffractive optical elements disclosed in Documents II to IV. Therefore, the diffractive optical element of the present embodiment significantly reduces deterioration in diffraction efficiency for the obliquely incident light, which makes it possible to apply the diffractive optical element of the present embodiment to more widely various optical systems. It is preferable that the grating height be as low as possible. However, a grating height of 0.5 μm or less may reduce alternatives of the material which can be actually used. Accordingly, it is desirable that the grating height d be set within a range of 0.5 μm≦d≦7.0 μm.

Further, in order to decrease the grating height and increase the diffraction efficiency for the designed order in the entire visible wavelength range, it is preferable that an Abbe constant vd1 of the material of the first diffraction grating 2 be set to be equal to or smaller than 20, and an Abbe constant vd2 of the material of the second diffraction grating 3 be set to be equal to or larger than 15 and equal to or smaller than 60. Moreover, it is preferable that vd2 be larger than vd1. That is, it is preferable to satisfy the following conditions:

vd1<vd2 vd1≦20

15≦vd2≦60.

If these conditions are not satisfied, the grating height becomes too high to obtain a high diffraction efficiency in the entire visible wavelength range.

It is more preferable that the Abbe constant vd2 of the material of the second diffraction grating 3 be set to be equal to or larger than 25 and equal to or smaller than 55 (that is, 25≦vd2≦55). This range of the Abbe constant vd2 increases alternatives of the material, which increases possibility of the diffractive optical element 1 of the present embodiment.

Moreover, it is still more preferable that a value of:

$(n2(\lambda)-n1(\lambda))d/m\lambda$ (5)

be within a range from 0.9217 to 1.0783. The value is obtained by dividing an optical path length difference between an optical path length at the mountain (convex portion) and an optical path length at the valley (concave portion) of each diffraction grating for the diffracted light of an m-th order which is the designed order, by a product of the designed order and the wavelength. That is, it is still more preferable to satisfy the following condition:

$0.9217 \leq (n2(\lambda)-n1(\lambda))d/m\lambda \leq 1.0783$.

In this range, the diffraction efficiency for the designed order obtained by the scalar diffraction theory calculation is 98% or more, and the diffraction efficiency for the designed order obtained by the rigorous electromagnetic calculation when the grating pitch is 100 μm is 97% or more. Outside this range, the diffraction efficiency for the designed order reduces and the diffraction efficiency for the unnecessary order increases, which is unfavorable.

The present embodiment described the case in which the designed order is the +1st order. However, the designed order is not limited thereto, and may be other orders such as +2nd order and +3rd order. In this case, setting a combined optical path length difference of the first and second diffraction gratings forming the diffractive optical element so as to have a desired designed order and a desired designed wavelength enables provision of effects which is the same as those of the present embodiment.

Figure 4A:
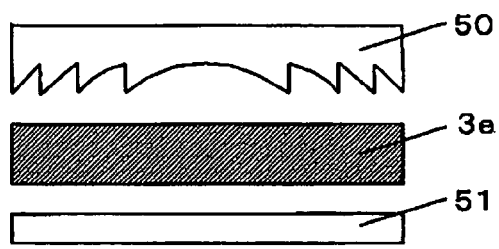
FIG. 4 is a diagram showing a method for manufacturing the diffractive optical element of Embodiment 1.

A method for manufacturing the diffractive optical element 1 in the present embodiment will be described with reference to FIG. 4. First, the second diffraction grating 3 is manufactured by using glass. Specifically, a metal mold 50 having a shape into which the grating shape of the second diffraction grating 3 is inverted, the glass (low-melting glass) 3e for the second diffraction grating 3, and a metal mold 51 for forming the base portion of the second diffraction grating 3 are prepared (FIG. 4A). These are set in a glass mold forming machine.

Figure 4D:
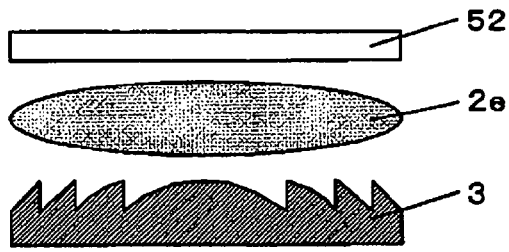
Figure 4B:
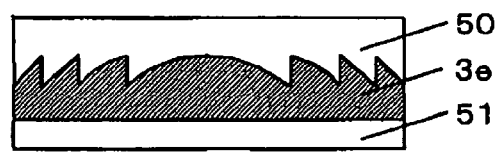

Then, these are heated to a deformation point of the glass 3e or more, and thereafter, these are pressurized to transfer the inverted shape of the diffraction grating on the metal mold 50 onto the glass 3e (FIG. 4B). At this time, the inside of the mold forming machine is made into a vacuum state or a state filled with inert gas.

Figure 4E:
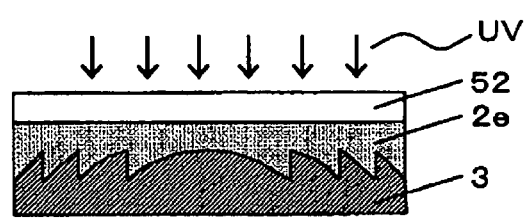
Figure 4C:
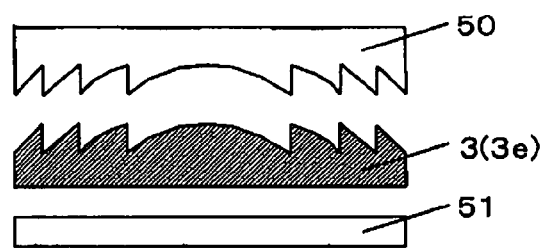

Next, the metal mold 50, the glass 3e (second diffraction grating 3), and the metal mold 51 are gradually cooled down to a transition point of the glass 3e, and thereafter, the metal molds 50 and 51 are demolded (FIG. 4C). Thereby, the manufacture of the second diffraction grating 3 is completed.

Next, the first diffraction grating 2 is formed. Specifically, the second diffraction grating 3, ultraviolet curable resin 2e serving as the material of the first diffraction grating 2, and a glass mold 52 for forming the base portion of the first diffraction grating 2 are prepared (FIG. 4D). These are set in a UV exposure machine.

Figure 4F:
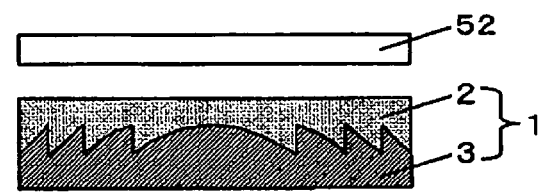

Then, in a state in which these are pressurized, irradiation of ultraviolet light UV on them is made from a glass mold side, which causes the ultraviolet curable resin 2e to harden. Thereby, the grating shape of the second diffraction grating 3 is transferred onto the ultraviolet curable resin 2e (FIG. 4E). Thereafter, the glass mold 52 is demolded (FIG. 4F). Thereby, the manufacture of the diffractive optical element 1 in which the first and second diffraction gratings 2 and 3 are stacked so as not to provide any air layer therebetween is completed.

In this way, the manufacture of the second diffraction grating 3 from glass by using the metal molds is performed in advance, and then the manufacture of the first diffraction grating 2 from the ultraviolet curable resin by using the second diffraction grating 3 as another mold. This enables the manufacture of the diffractive optical element 1 at high mass productivity and at low cost. This manufacturing method can be used in the manufacture of diffractive optical elements in Embodiments 2 and 3 which will be described later.

Further, the grating height of the diffractive optical element in the present embodiment is significantly lower than those of the diffractive optical elements disclosed in Documents II to IV. The fact is effective for accurately forming the shape of the grating portion in glass molding of the second diffraction grating 3.

The above-described method for manufacturing the diffractive optical element is merely one example. Other manufacturing methods such as cutting work, or lithography and etching may be used. Further, the first and second diffraction gratings 2 and 3 may be separately manufactured, and thereafter, the both may be joined (stacked) each other.

Further, in the present embodiment, the description was made of the case in which the grating surfaces of the first and second diffraction gratings 2 and 3 contact each other. However, the grating surfaces may have a thin film layer (adhesive layer) therebetween. In this case as well, the grating surfaces of the first and second diffraction gratings 2 and 3 does not have a air layer therebetween. Providing the thin film layer enables improvement of adhesiveness between the grating surfaces.

Moreover, when the refractive index difference between the materials of the first diffraction grating 2 and the second diffraction grating 3 is large, interface (grating surfaces) thereof may have an antireflection layer therebetween to reduce reflectance at the interface.

Further, as described above, the surfaces opposite to the grating surfaces of the respective diffraction gratings (surfaces of the base portions) are not limited to flat surfaces, and may be spherical surfaces or aspheric surfaces. In this case, the spherical surfaces or the aspheric surfaces can be formed at the same time as the manufacture of the diffraction gratings, which decreases the manufacturing cost of the diffraction optical element.

Comparative Example 1

Comparative example (simulation example) 1 for the diffractive optical element of the present embodiment will be described. Comparative Example 1 has a grating height which is the same as that in the present embodiment, and uses virtual materials whose absolute values of the refractive indexes are lower than those in the present embodiment, the virtual materials being capable of providing a diffraction efficiency characteristic which is substantially the same as that of the present embodiment (that is, a characteristic in which a value of the expression (5) is substantially the same as that of the present embodiment in the entire use wavelength range). Comparative Example 1 uses as the virtual material of the first diffraction grating 2 a material having nd=1.480, vd=17.0, and θgF=0.400. Further, Comparative Example 1 uses as the virtual material of the second diffraction grating 3 a material having nd=1.594, vd=68.9, and θgF=−0.521. The grating height d is 5.2 μm.

The diffraction efficiency of the diffractive optical element of Comparative Example 1 for the designed order (+1st order) with a grating pitch of 100 μm was 97.16% or more in the entire visible wavelength range (430 nm to 670 nm). However, as compared with Embodiment 1, the diffraction efficiency for the designed order (+1st order) was lower by 0.06%. The fact that the diffraction efficiency is lower by 0.06% causes the unnecessary diffracted light to have an effect on an image formed on the image-forming surface when image-taking is performed under a high intensity light source such as the sun, or a long-time exposure is performed. For this reason, it can be said that the diffractive optical element in the present embodiment in which the materials having high absolute values of the refractive indexes are combined is advantageous to reduce the unnecessary diffracted light.

Further, in a case in which the grating height is 5.2 μm and materials having low refractive indexes are combined, it is difficult to select materials from among existing materials. The use of the existing materials brings about a higher grating height as the diffractive optical elements disclosed in Documents II to IV, which is not comparable with the present embodiment. Moreover, a high grating height deteriorates the characteristic of the diffraction optical element for the obliquely incident light. As a result, the diffractive optical element cannot be applied to widely various optical systems.

Accordingly, the diffractive optical element in the present embodiment is also advantageous in selectivity of the materials and applicability to widely various optical systems.

Embodiment 2

Embodiment 1 described that the materials of the first and second diffraction gratings 2 and 3 are not limited to ultraviolet curable resin and glass. A diffractive optical element that is a second embodiment (Embodiment 2) of the present invention uses ultraviolet curable resin into which microparticles are mixed as a material of the first diffraction grating 2. Thereby, the diffraction efficiency for the designed order can be increased more than that in Embodiment 1 in the entire visible wavelength range. A numerical example of the present embodiment will be shown below.

In the present numerical example, a resin formed by mixing ITO microparticles into an ultraviolet curable resin UV1000 (nd=1.658, vd=15.9, θgF=0.532) is used as a material of the first diffraction grating 2. Further, an optical glass M-TAF101 (nd=1.768, vd=49.2, θgF=0.551) is used as a material of the second diffraction grating 3. The grating height d is 5.4 μm.

Figure 5:
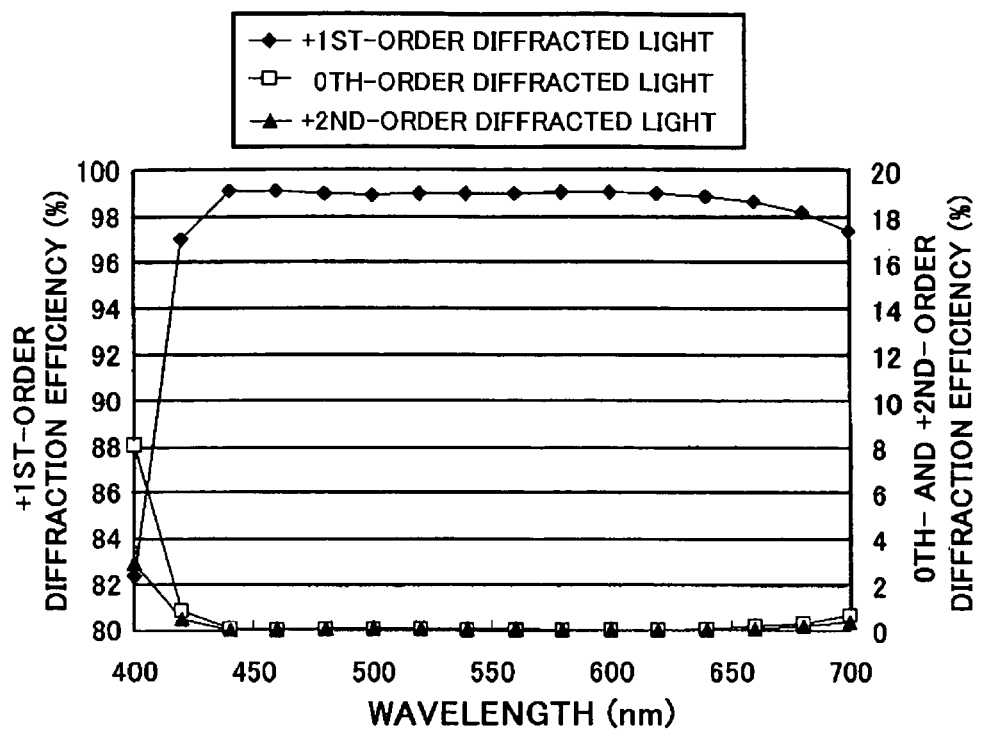
FIG. 5 is a graph showing diffraction efficiency of a diffractive optical element of Embodiment 2.

FIG. 5 shows the diffraction efficiency of the diffractive optical element of the present numerical example for the designed order (+1st order) and the diffraction efficiencies for unnecessary diffracted lights of a 0th order and a +2nd order with a grating pitch of 100 μm, the 0th order and the +2nd order being orders corresponding to the designed order ±1, respectively. In FIG. 5, the left vertical axis shows the diffraction efficiency for the diffracted light of the +1st order that is the designed order, and the right vertical axis shows the diffraction efficiencies for the diffracted lights of the 0th-order and the +2nd-order that are the unnecessary orders. The horizontal axis shows wavelength.

The present numerical example provides a diffraction efficiency of 98.1% or more for the designed order in the entire visible wavelength range (430 nm to 670 nm), and a diffraction efficiency of 0.5% or less for the unnecessary orders in the entire visible wavelength range.

In this way, in the present numerical example, in the entire visible wavelength range, the diffraction efficiency of the +1st order is higher and the diffraction efficiencies for the 0th-order and the +2nd order are lower, as compared with the numerical example of Embodiment 1. In the present numerical example, since the partial dispersion ratio θgF1 of the microparticle dispersion material (material of the first diffraction grating 2) is 0.532 which is a small value, the combination of the materials can provide a higher diffraction efficiency than that of the numerical example of Embodiment 1.

It is preferable for θgF1 to satisfy the following conditional expression (6):

$$\theta gF1 \leq (-1.665E\text{-}07 \times vd1^3 + 5.213E\text{-}05 \times vd1^2 - 5.656E\text{-}03 \times vd1 + 0.675) \qquad (6)$$

where "E-X" means "$\times 10^{-X}$".

If θgF1 exceeds the range of the expression (6), the diffraction efficiency for the +1st order may be deteriorated in a specific wavelength range in the entire visible wavelength range. In the present embodiment, as one of means for setting θgF1 to a value within the range of the expression (6), the microparticles are mixed into the ultraviolet curable resin.

As a material of the microparticle, any inorganic microparticle material such as oxide, metal, ceramics, a compound thereof, and a mixture thereof is preferable. However, the material of the microparticle is not limited to such inorganic microparticle material. Further, an average particle diameter of the microparticles is preferably equal to or less than ¼ of a wavelength of light entering into the diffractive optical element (that is, ¼ of the use wavelength or the designed wavelength). This is because a particle diameter larger than ¼ of the use wavelength (designed wavelength) may increase Rayleigh scattering when the microparticles are mixed into the resin material. Further, as the ultraviolet curable resin into which the microparticles are mixed, any organic resin such as acrylic resin, fluorocarbon resin, polyvinyl resin, and epoxy resin is preferable. However, the ultraviolet curable resin is not limited to such organic resin.

Comparative Example 2

Comparative example (simulation example) 2 of the diffractive optical element of the present embodiment will be described. Comparative Example 2 has a grating height which is the same as that in the present embodiment, and uses virtual materials whose absolute values of the refractive indexes are lower than those in the present embodiment, the virtual materials being capable of providing a diffraction efficiency characteristic which is substantially the same as that of the present embodiment (that is, a characteristic in which a value of the expression (5) is substantially the same as that of the present embodiment in the entire use wavelength range). Comparative Example 2 uses as the virtual material of the first diffraction grating 2 a material having nd=1.490, vd=15.0, and θgF=0.400 is used. Further, Comparative Example 2 uses as the virtual material of the second diffraction grating 3 a material having nd=1.600, vd=86.5, and θgF=-0.05. The grating height d is 5.4 µm.

The diffraction efficiency of the diffractive optical element of Comparative Example 1 for the designed order (+1st order) with a grating pitch of 100 µm was 98.02% or more in the entire visible wavelength range (430 nm to 670 nm). However, as compared with Embodiment 2, the diffraction efficiency for the designed order (+1st order) was lower by 0.05%.

The fact that the diffraction efficiency is lower by 0.05% causes the unnecessary diffracted light to have an effect on an image formed on the image-forming surface when image-taking is performed under a high intensity light source such as the sun, or a long-time exposure is performed. For this reason, the diffractive optical element in the present embodiment in which the materials having high absolute values of the refractive indexes are combined is advantageous to reduce the unnecessary diffracted light.

Further, in a case in which the grating height is 5.4 µm and materials having low refractive indexes are combined, it is difficult to select materials from among existing materials. The use of the existing materials brings about a higher grating height as the diffractive optical elements disclosed in Documents II to IV, which is not comparable with the present embodiment. Moreover, a high grating height deteriorates the characteristic of the diffraction optical element for the obliquely incident light. As a result, the diffractive optical element cannot be applied to widely various optical systems.

Accordingly, the diffractive optical element in the present embodiment is also advantageous in selectivity of the materials and applicability to widely various optical systems.

Embodiment 3

Embodiment 2 used the ultraviolet curable resin into which microparticles are mixed as the material of the second diffraction grating 2, and used glass as the material of the second diffraction grating 3. In a diffractive optical element that is a third embodiment (Embodiment 3) of the present invention, a combination of materials whose refractive index difference is larger than that in Embodiment 2 is used for reducing the grating height. A numerical example of the present embodiment will be shown below.

In the present numerical example, a resin formed by mixing ITO microparticles into an ultraviolet curable resin PVCz (nd=1.716, vd=13.3, θgF=0.542) is used as a material of the first diffraction grating 2. Further, an optical glass L-LAH83 (nd=1.864, vd=40.6, θgF=0.567) is used as a material of the second diffraction grating 3. The grating height d is 4.0 µm.

Figure 6:
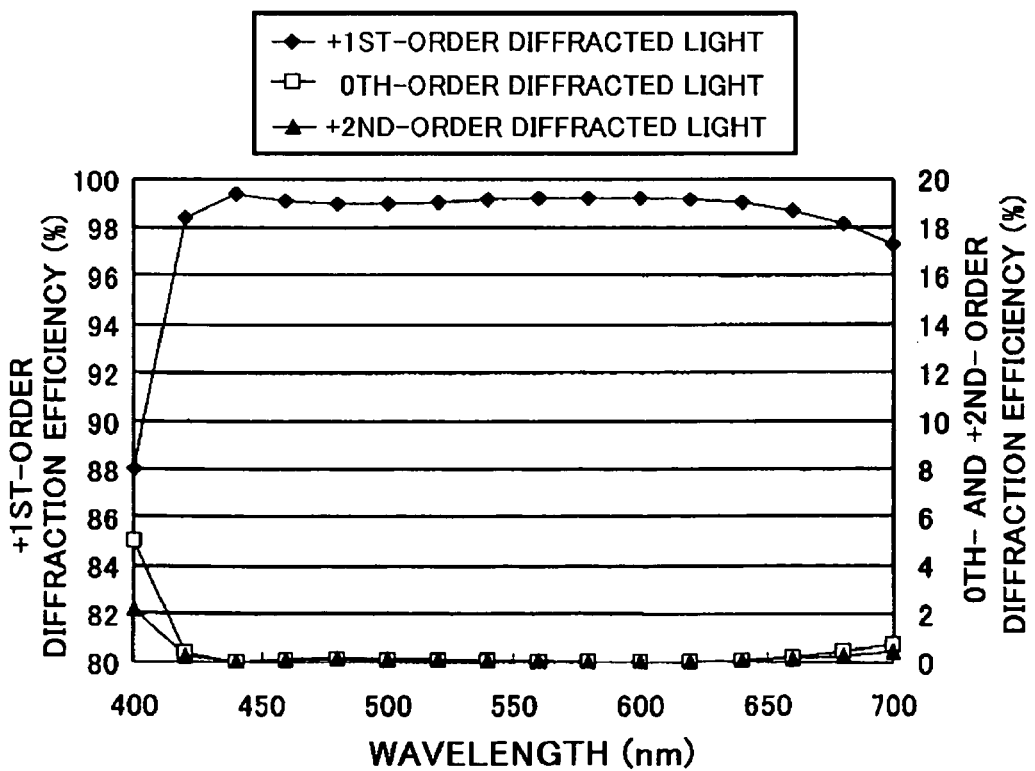
FIG. 6 is a graph showing diffraction efficiency of a diffractive optical element of Embodiment 3.

FIG. 6 shows the diffraction efficiency of the diffractive optical element of the present numerical example for the designed order (+1st order) and the diffraction efficiencies for unnecessary diffracted lights of a 0th order and a +2nd order with a grating pitch of 100 µm, the 0th order and the +2nd order being orders corresponding to the designed order ±1, respectively.

In FIG. 6, the left vertical axis shows the diffraction efficiency for the diffracted light of the +1st order that is the designed order, and the right vertical axis shows the diffraction efficiencies for the diffracted lights of the 0th-order and the +2nd-order that are the unnecessary orders. The horizontal axis shows wavelength.

The present numerical example provides a diffraction efficiency of 98.4% or more for the designed order in the entire visible wavelength range (430 nm to 670 nm), and a diffraction efficiency of 0.3% or less for the unnecessary orders in the entire visible wavelength range.

In this way, in the present numerical example, in the entire visible wavelength range, as compared with the numerical examples in Embodiments 1 and 2, the diffraction efficiency for the +1st order is higher and the diffraction efficiencies for the 0th order and +2nd order are lower in the diffractive optical element whose grating height is reduced by increasing the refractive index difference. Further, the low grating height further reduces deterioration in the diffraction efficiency for the obliquely incident light, which makes it possible to apply the diffractive optical element to more widely various optical systems.

Embodiment 4

In Embodiments 1 to 3, glass is used as the material of the second diffraction grating 3. A diffractive optical element that is a fourth embodiment (Embodiment 4) of the present invention uses light-transmissive ceramics having a high transmittance for light in the visible wavelength range as a material of the second diffraction grating 3. A numerical example of the present embodiment will be shown below.

In the present numerical example, a resin formed by mixing ITO microparticles into an ultraviolet curable resin UV1000 (nd=1.682, vd=12.4, θgF=0.451) is used as a material of the first diffraction grating 2. Further, a transparent YAG ceramics which is a light-transmissive ceramics (nd=1.83, vd=52, θgF=0.55) is used as a material of the second diffraction grating 3. The grating height d is 3.9 μm.

Figure 7:
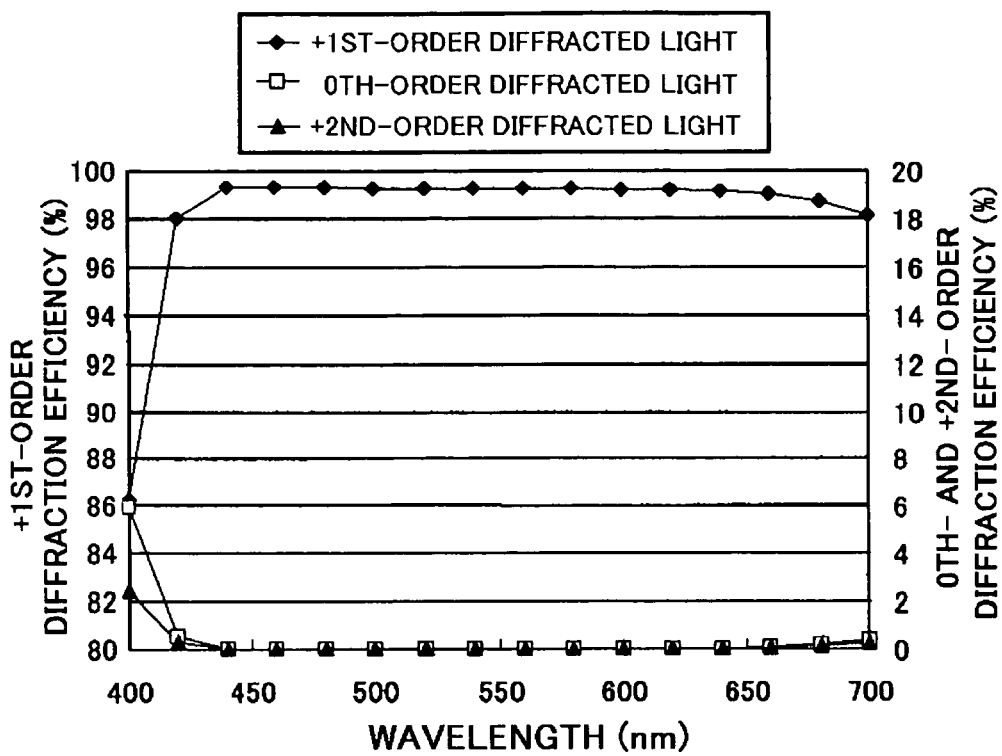
FIG. 7 is a graph showing diffraction efficiency of a diffractive optical element of Embodiment 4.

FIG. 7 shows the diffraction efficiency of the diffractive optical element of the present numerical example for the designed order (+1st order) and the diffraction efficiencies for unnecessary diffracted lights of a 0th order and a +2nd order with a grating pitch of 100 μm, the 0th order and the +2nd order being orders corresponding to the designed order ±1, respectively. In FIG. 7, the left vertical axis shows the diffraction efficiency for the diffracted light of the +1st order that is the designed order, and the right vertical axis shows the diffraction efficiencies for the diffracted lights of the 0th order and the +2nd order that are the unnecessary orders. The horizontal axis shows wavelength.

The present numerical example provides a diffraction efficiency of 98.6% or more for the designed order in the entire visible wavelength range (430 nm to 670 nm), and a diffraction efficiency of 0.3% or less for the unnecessary orders in the entire visible wavelength range.

The diffractive optical element in the present embodiment can be manufactured by a manufacturing method which is basically the same as that described in Embodiment 1. However, the process corresponding to FIG. 4B transfers the inverted shape of the diffraction grating 3 formed on the mold 50 onto a material formed by mixing ceramics raw material powder and binder resin as the material of the second diffraction grating 3. Then, the process of FIG. 4C performs firing of the demolded second diffraction grating 3 at a high temperature. The subsequent processes (FIGS. 4D to 4F) are the same as those in Embodiment 1.

In this way, the manufacture of the second diffraction grating 3 from ceramics by using the metal mold is performed in advance, and then the manufacture of the first diffraction grating 2 from the ultraviolet curable resin by using the second diffraction grating 3 as another mold. This enables the manufacture of the diffractive optical element at high mass productivity and at low cost. However, the method for manufacturing the diffractive optical element 1 in the present embodiment is not limited thereto.

Further, in the present embodiment, since the second diffraction grating 3 is formed and fired at a high temperature by using the material formed by mixing the ceramics raw material powder and the binder resin, reduction of the grating height d enables a further improvement of shape accuracy of the grating portions.

Embodiment 5

In Embodiment 4, the ceramic material is used as the material of the second diffraction grating 3. In a diffractive optical element that is a fifth embodiment (Embodiment 5) of the present invention, a combination of materials whose refractive index difference is higher than those of Embodiments 1 to 4 is used for reducing the grating height. A numerical example of the present embodiment will be shown below.

In the present numerical example, a resin formed by mixing ITO microparticles into an ultraviolet curable resin UV1000 (nd=1.790, vd=6.1, θgF=0.293) is used as a material of the first diffraction grating 2. Further, LUMICERA™ which is a light-transmissive ceramics (nd=2.082, vd=30.1, θgF=0.583) is used as a material of the second diffraction grating 3. The grating height d is 2.0 μm.

Figure 8:
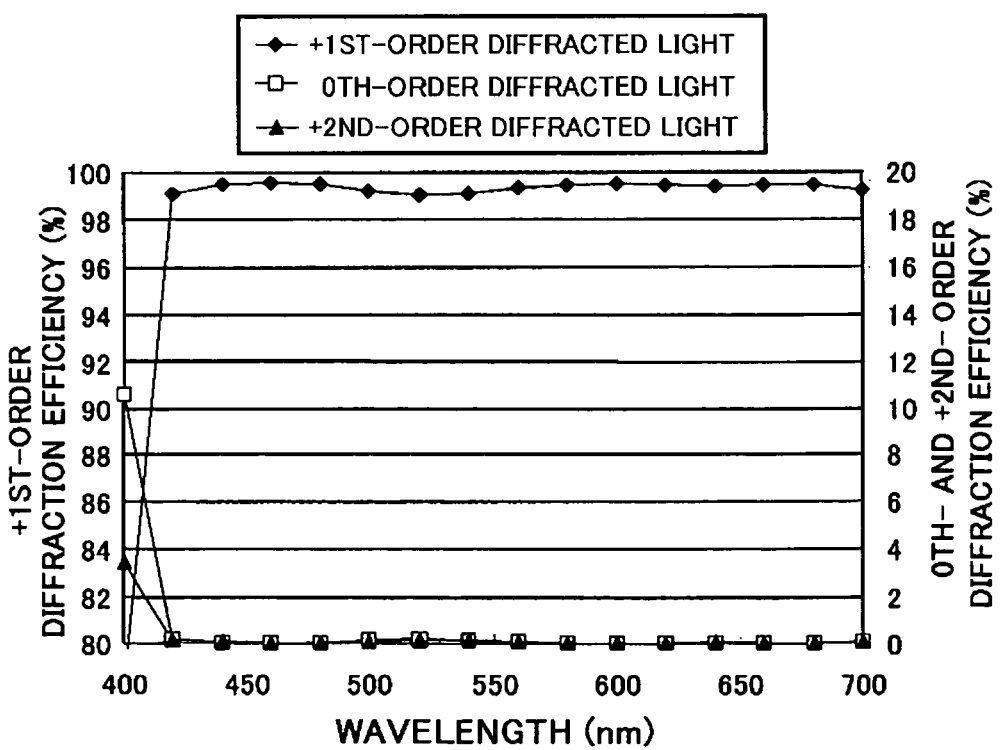
FIG. 8 is a graph showing diffraction efficiency of a diffractive optical element of Embodiment 5.

FIG. 8 shows the diffraction efficiency of the diffractive optical element of the present numerical example for the designed order (+1st order) and the diffraction efficiencies for unnecessary diffracted lights of a 0th order and a +2nd order with a grating pitch of 100 μm, the 0th order and the +2nd order being orders corresponding to the designed order ±1, respectively. In FIG. 8, the left vertical axis shows the diffraction efficiency for the diffracted light of the +1st order that is the designed order, and the right vertical axis shows the diffraction efficiencies for the diffracted lights of the 0th-order and the +2nd-order that are the unnecessary orders. The horizontal axis shows wavelength.

The present numerical example provides a diffraction efficiency of 99.0% or more for the designed order in the entire visible wavelength range (430 nm to 670 nm), and a diffraction efficiency of 0.1% or less for the unnecessary orders in the entire visible wavelength range.

In this way, in the present numerical example, in the entire visible wavelength range, as compared with the numerical examples in Embodiments 1 to 4, the diffraction efficiency for the +1st order is higher and the diffraction efficiencies for the 0th order and +2nd order are lower in the diffractive optical element whose grating height is reduced by increasing the refractive index difference. Further, the low grating height further reduces deterioration in the diffraction efficiency for the obliquely incident light, which makes it possible to apply the diffractive optical element to more widely various optical systems.

The present numerical example is merely one example. The materials and grating height of the respective diffraction gratings are not limited to the values in the present numerical example. Further, Embodiments 1 to 5 shows the case in which glass or ceramics is used as the material of the second diffraction grating 3. However, organic material or optical crystal material may be used as the material of the second diffraction grating 3.

The materials used in Embodiments 1 to 5 will be more specifically described with reference to Tables 3 and 4, and FIGS. 9 and 10. Table 3 shows various numeric values in the diffractive optical elements in Embodiment (Numerical example) 1, Comparative Example 1, Embodiment (Numerical example) 2, and Comparative Example 2. Further, Table 4 shows various numeric values in the diffractive optical elements in Embodiments (Numerical examples) 3 to 5. The various numeric values include the material of the first diffraction grating 2, the refractive index nd1, the Abbe constant vd1, and the partial dispersion ratio θgF1 of the material, and the values on the right-hand side of the expression (6). Further, the various numeric values include the material of the second diffraction grating 3, and the refractive index nd2, and the Abbe constant vd2 of the material. Moreover, the various numeric values include the grating height d, the value of the expression (5) at wavelengths of 430 nm, 500 nm and 670 nm, the diffraction efficiency obtained by the scalar diffraction theory calculation, and the diffraction efficiency for the +1st order with a grating pitch of 100 μm obtained by the rigorous electromagnetic calculation.

Figure 9:
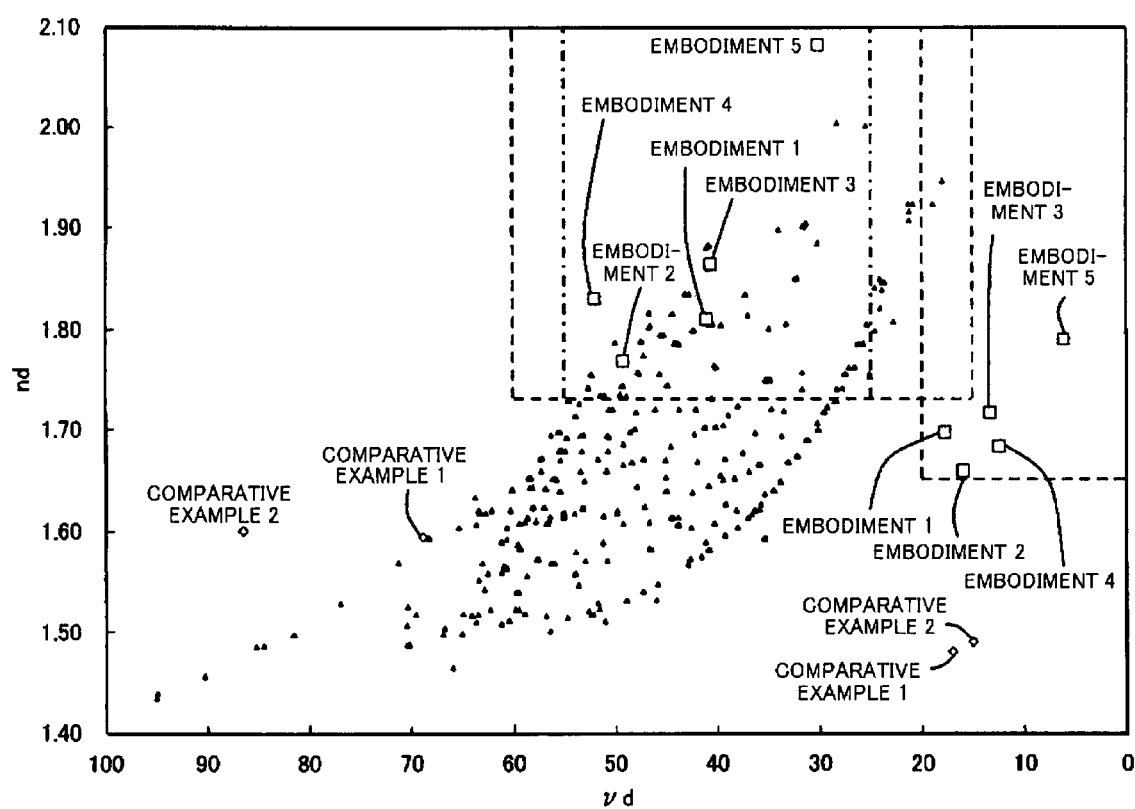
FIG. 9 is a diagram showing nd–vd characteristics of the materials of the diffractive optical elements of Embodiments 1 to 5.
Figure 10:
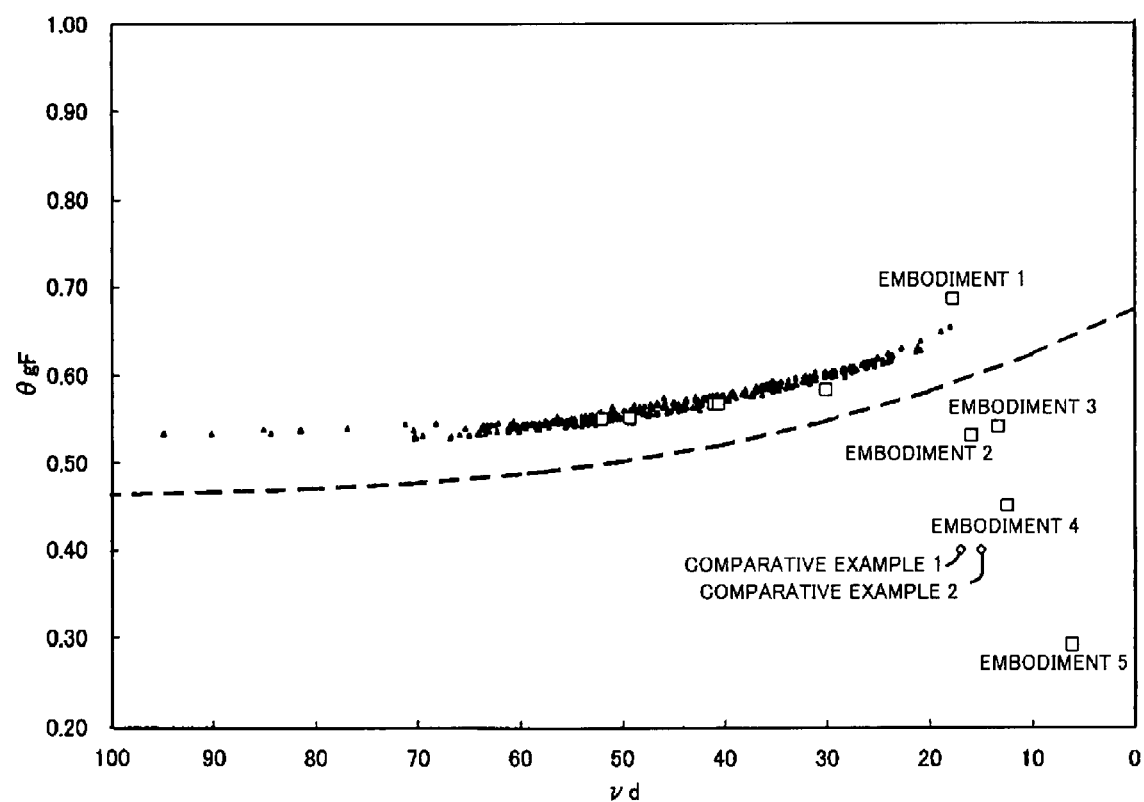
FIG. 10 is a diagram showing nd–θgF characteristics of the materials of the diffractive optical elements of Embodiments 1 to 5.

Further, FIG. 9 shows a relationship between the refractive indexes nd and the Abbe constants vd shown in Tables 3 and 4. FIG. 10 shows a relationship between the partial dispersion ratios θgF and the Abbe constants vd.

TABLE 3

|  | EMBODIMENT 1 | COMPARATIVE EXAMPLE 1 | EMBODIMENT 2 | COMPARATIVE EXAMPLE 2 |
|---|---|---|---|---|
| nd1 | 1.696 | 1.480 | 1.6858 | 1.4900 |
| vd1 v | 17.7 | 17.0 | 15.9 | 15.0 |
| θgF1 | 0.686 | 0.4 | 0.532 | 0.4 |
| RIGHT-HAND SIDE OF EXPRESSION (6) | 0.590 | 0.593 | 0.598 | 0.601 |
| nd2 | 1.810 | 1.594 | 1.768 | 1.6000 |
| vd2 | 41.0 | 68.9 | 49.2 | 86.5 |
| GRATING HEIGHT d (μm) | 5.2 | 5.2 | 5.4 | 5.4 |
| EXPRESSION (5): 430 nm | 0.9787 | 0.9787 | 0.9599 | 0.9599 |
| DIFFRACTION EFFICIENCY % (SCALAR DIFFRACTION THEORY CALCULATION): 430 nm | 99.85 | 99.85 | 99.47 | 99.47 |
| DIFFRACTION EFFICIENCY % (RIGOROUS ELECTROMAGNETIC CALCULATION): 430 nm | 98.69 | 98.63 | 98.07 | 98.02 |
| EXPRESSION (5): 500 nm | 1.0632 | 1.0632 | 1.0253 | 1.0253 |
| DIFFRACTION EFFICIENCY % (SCALAR DIFFRACTION THEORY CALCULATION): 500 nm | 98.69 | 98.69 | 99.789 | 99.789 |
| DIFFRACTION EFFICIENCY % (RIGOROUS ELECTROMAGNETIC CALCULATION): 500 nm | 97.95 | 97.89 | 98.96 | 98.92 |
| EXPRESSION (5): 670 nm | 0.9277 | 0.9277 | 0.9599 | 0.9599 |
| DIFFRACTION EFFICIENCY % (SCALAR DIFFRACTION THEORY CALCULATION): 670 nm | 98.29 | 98.29 | 99.47 | 99.47 |
| DIFFRACTION EFFICIENCY % (RIGOROUS ELECTROMAGNETIC CALCULATION): 670 nm | 97.23 | 97.16 | 98.40 | 98.34 |

TABLE 4

|  | EMBODIMENT 3 | EMBODIMENT 4 | EMBODIMENT 5 |
|---|---|---|---|
| nd1 | 1.716 | 1.682 | 1.790 |
| vd1 | 13.3 | 12.4 | 6.1 |
| θgF1 | 0.542 | 0.451 | 0.293 |
| RIGHT-HAND SIDE OF EXPRESSION (6) | 0.609 | 0.612 | 0.643 |
| nd2 | 1.864 | 1.83 | 2.082 |
| vd2 | 40.6 | 52 | 30.1 |
| GRATING HEIGHT d (μm) | 4.0 | 3.9 | 2.0 |
| EXPRESSION (5): 430 nm | 0.9814 | 0.9711 | 1.0033 |
| DIFFRACTION EFFICIENCY % (SCALAR DIFFRACTION THEORY CALCULATION): 430 nm | 99.89 | 99.73 | 100.00 |
| DIFFRACTION EFFICIENCY % (RIGOROUS ELECTROMAGNETIC CALCULATION): 430 nm | 98.82 | 98.64 | 99.25 |
| EXPRESSION (5): 500 nm | 1.0331 | 1.0091 | 0.9689 |
| DIFFRACTION EFFICIENCY % (SCALAR DIFFRACTION THEORY CALCULATION): 500 nm | 99.64 | 99.97 | 99.68 |
| DIFFRACTION EFFICIENCY % (RIGOROUS ELECTROMAGNETIC CALCULATION): 500 nm | 98.95 | 99.26 | 99.17 |
| EXPRESSION (5): 670 nm | 0.9535 | 0.9710 | 1.0055 |
| DIFFRACTION EFFICIENCY % (SCALAR DIFFRACTION THEORY CALCULATION): 670 nm | 99.29 | 99.72 | 99.99 |
| DIFFRACTION EFFICIENCY % (RIGOROUS ELECTROMAGNETIC CALCULATION): 670 nm | 98.37 | 98.83 | 99.39 |

As is clear from Tables 3 and 4, as described above, it is preferable that the refractive index nd1 for the d-line of the material of the first diffraction grating 2 be 1.65 or more, and that the refractive index nd2 for the d-line of the material of the second diffraction grating 3 be 1.73 or more. Further, it is preferable that the Abbe constant vd1 of material of the first diffraction grating 2 be equal to or less than 20, and that the Abbe constant vd2 of the material of the second diffraction grating 3 be equal to or larger than 15 and equal to or less than 60.

Moreover, it is more preferable that the Abbe constant vd2 of the second diffraction grating 3 be equal to or larger than 25 and equal to or less than 55.

Further, if θgF1 satisfies the expression (6), the diffraction efficiency at a specific wavelength range in the visible wavelength range is less decreased, thereby bringing about a higher diffraction efficiency in the entire visible wavelength range, which is more preferable.

Further, if the value of the expression (5) is within a range from 0.9217 to 1.0783, the diffraction efficiency for the designed order obtained by the scalar diffraction theory calculation is 98% or more, and the diffraction efficiency obtained by the rigorous electromagnetic calculation with a grating pitch of 100 μm is 97% or more, which is more preferable.

As described above, each of Embodiments 1 to 5 realizes, with consideration of the effect of the grating side surfaces, a diffractive optical element with little deterioration in diffraction efficiency caused by the obliquely incident light and with a high diffraction efficiency for the designed order in the use wavelength range.

Embodiment 6

Figure 11:
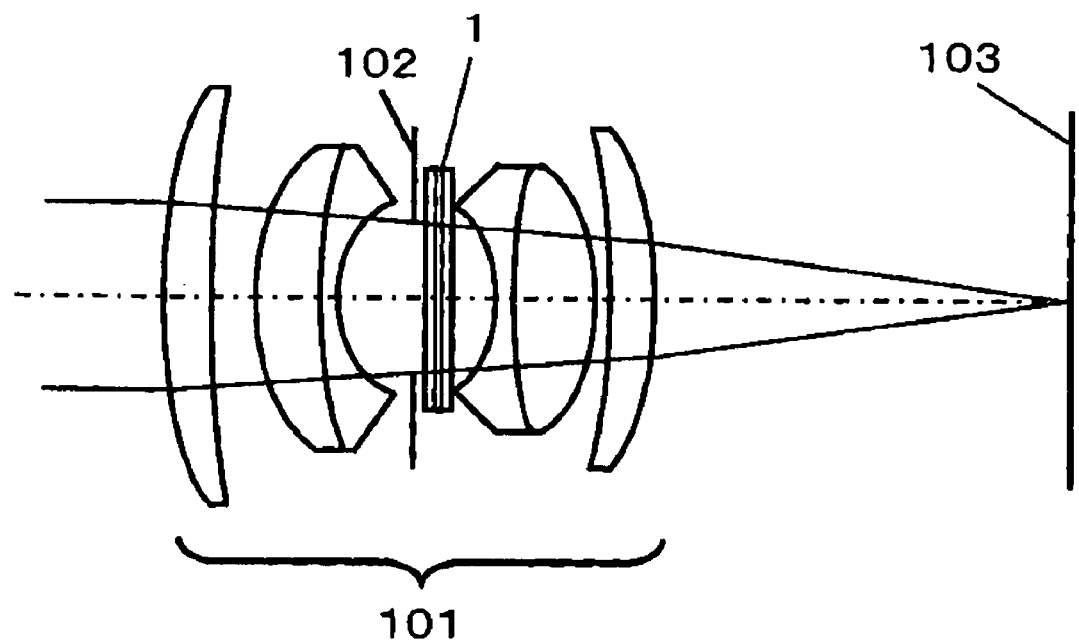
FIG. 11 is a schematic diagram of an image-taking optical system that is Embodiment 6 of the present invention.

FIG. 11 shows an example of an optical system using the diffractive optical element 1 described in Embodiments 1 to 5, as a sixth embodiment (Embodiment 6) of the present invention. FIG. 11 shows a cross section of an image-taking optical system (image-taking lens) used for an optical apparatus (image-taking apparatus) such as a digital camera or a video camera.

Reference numeral 101 denotes an image-taking lens mainly constituted by refractive lenses (refractive optical elements), the image-taking lens 101 including thereinside an aperture stop 102 and the diffractive optical element 1 described in Embodiments 1 to 5. The diffractive optical element 1 is manufactured so as to have a flat plate shape with a flat glass plate serving as a substrate. Further, the diffractive optical element 1 is disposed near the aperture stop 102 which limits a diameter of a light flux in the image-taking lens 101.

Reference numeral 103 denotes an image-forming surface on which a film or an image-pickup element such as a CCD sensor or a CMOS sensor is disposed.

The diffractive optical element 1 has a lens function to correct chromatic aberration generated in the image-taking lens 101. As described in Embodiments 1 to 5, the diffractive optical element 1 has a high diffraction efficiency for the designed order in the entire visible wavelength range, and its low grating height reduces the deterioration in diffraction efficiency due to the obliquely incident light. Therefore, the use of the diffractive optical element 1 realizes an image-taking lens which generates little flare under various use environments, has a high resolving power at a low frequency, and achieves a high optical performance.

FIG. 11 shows the case in which the diffractive optical element 1 having a flat plate shape is provided near the aperture stop 102. However, the diffractive optical element 1 may be disposed at a position other than the position near the aperture stop 102, and may be formed on a convex surface or a concave surface of a lens serving as a substrate. Further, the diffractive optical element 1 may be plurally provided in the image-taking lens 101.

Further, the present embodiment uses the diffractive optical element in the image-taking lens of the camera. However, the diffractive optical element may be used in an optical system of other optical apparatuses such as an image scanner or a copier.

Embodiment 7

Figure 12:
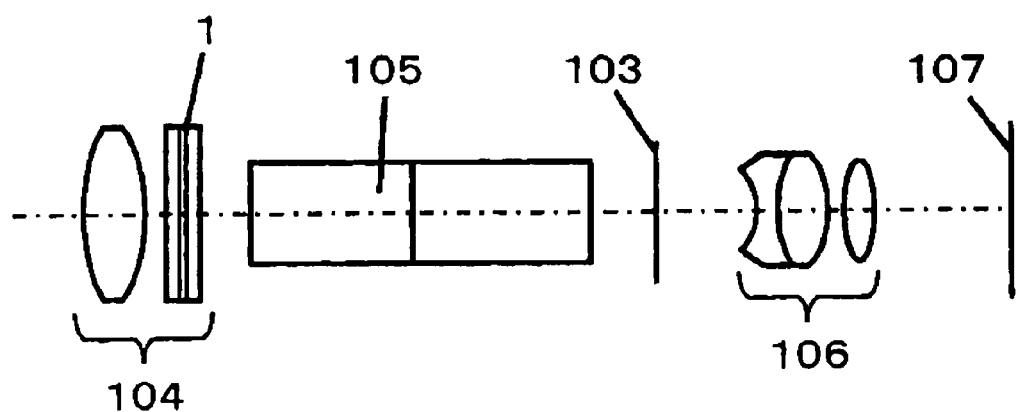
FIG. 12 is a schematic diagram of an observation optical system that is Embodiment 7 of the present invention.

FIG. 12 shows an example of an optical system using the diffractive optical element 1 described in Embodiments 1 to 5, as a seventh embodiment (Embodiment 7) of the present invention. FIG. 12 shows a cross section of an observation optical system such as a telescope or a binocular telescope.

Reference numeral 104 denotes an objective lens, and reference numeral 105 denotes an image inverting prism for erecting an image. Reference numeral 106 denotes an ocular lens, and reference numeral 107 denotes an evaluation surface (pupil surface). The diffractive optical element 1 is provided as part of the objective lens 104 including refractive optical elements to correct aberrations such as chromatic aberration appearing on an image-forming surface 103.

Providing the diffractive optical element 1 in the objective lens 104 disposed closer to an object than the image-forming surface 103 enables the objective lens 104 to independently reduce the chromatic aberration. Therefore, it is desirable for an observation optical system for naked eyes to provide the diffractive optical element 1 in the objective lens 104.

As described in Embodiments 1 to 5, the diffractive optical element 1 has a high diffraction efficiency for the designed order in the entire visible wavelength range, and its low grating height reduces the deterioration in diffraction efficiency due to the obliquely incident light. Therefore, the use of the diffractive optical element 1 realizes an observation optical system which generates little flare under various use environments, has a high resolving power at a low frequency, and achieves a high optical performance.

FIG. 12 shows the case in which the diffractive optical element 1 has a flat plate shape. However, the diffractive optical element 1 may be formed on a convex surface or a concave surface of a lens serving as a substrate. Further, the diffractive optical element 1 may be plurally provided in the observation optical system.

Further, FIG. 12 shows the case in which the diffractive optical element 1 is provided in the objective lens 104. However, the diffractive optical element 1 may be disposed at other positions such as on a surface of the prism 105 or in the ocular lens 106. This case as well provides an effect which is the same as that in the case in which the diffractive optical element 1 is provided in the objective lens 104.

The observation optical system in the present embodiment may be used for, not only a telescope or a binocular telescope, but also an optical viewfinder in an optical apparatus such as a lens shutter camera and a video camera.

Furthermore, the present invention is not limited to these embodiments and various variations and modifications may be made without departing from the scope of the present invention.

This application claims the benefit of Japanese Patent Application No. 2008-062676, filed on Mar. 12, 2008, which is hereby incorporated by reference herein in its entirety.

What is claimed is:

1. A diffractive optical element comprising:
a first diffraction grating and a second diffraction grating, which are formed of materials different from each other, the first diffraction grating and the second diffraction grating are stacked so as not to provide any air layer therebetween,
wherein the diffractive optical element satisfies the following conditions:

$nd1 < nd2$ $vd1 < vd2$ $1.65 \leq nd1, vd1 \leq 20$ $1.73 \leq nd2, 15 \leq vd2 \leq 60$ $0.9217 \leq (n2(\lambda) - n1(\lambda))d/m\lambda \leq 1.0783$ where nd1 and vd1 respectively represent a refractive index and an Abbe constant of the material of the first diffraction grating for a d-line, and nd2 and vd2 respectively represent a refractive index and an Abbe constant of the material of the second diffraction grating for the d-line, and d represents a grating height of each of the first diffraction grating and the second diffraction grating, and λ represents a use wavelength, n1(λ) and n2(λ) respectively represent refractive indexes of the first diffraction grating and the second diffraction grating at the use wavelength λ, and m represents a designed order.

2. The diffractive optical element according to claim 1, wherein the element satisfies the following condition:

$25 \leq \nu d2 \leq 55$.

3. The diffractive optical element according to claim 1, wherein the element satisfies the following condition:

$0.5 \, \mu m \leq d \leq 7.0 \, \mu m$.

4. The diffractive optical element according to claim 1, wherein the material of the first diffraction grating is ultraviolet curable resin.

5. The diffractive optical element according to claim 1, wherein the material of the first diffraction grating is a material in which microparticles are mixed into ultraviolet curable resin.

6. The diffractive optical element according to claim 1, wherein the material of the second diffraction grating is glass or ceramics.

7. An optical system comprising:
   the diffractive optical element according to claim 1; and
   a refractive optical element.

8. An optical apparatus comprising:
   an optical system including the diffractive optical element according to claim 1.

9. A diffractive optical element comprising:
   a first diffraction grating and a second diffraction grating, which are formed of materials different from each other, the first diffraction grating and the second diffraction grating are stacked so as not to provide any air layer therebetween,
   wherein the diffractive optical element satisfies the following conditions:

$nd1 < nd2$ $\nu d1 < \nu d2$ $1.65 \leq nd1, \nu d1 \leq 20$ $1.73 \leq nd2, 15 \leq \nu d2 \leq 60$ $\theta gF1 \leq (-1.665E{-}07 \times \nu d1^3 + 5.213E{-}05 \times \nu d1^2 - 5.656E{-}03 \times \nu d1 + 0.675)$ where nd1 and νd1 respectively represent a refractive index and an Abbe constant of the material of the first diffraction grating for a d-line, and nd2 and νd2 respectively represent a refractive index and an Abbe constant of the material of the second diffraction grating for the d-line, and θgF1 is a partial dispersion ratio of the material of the first diffraction grating for a g-line and an F-line, and $E{-}X$ represents $\times 10^{-X}$.

10. An optical system comprising:
    the diffractive optical element according to claim 9; and
    a refractive optical element.

11. An optical apparatus comprising:
    an optical system including the diffractive optical element according to claim 9.

* * * * *